US009563621B2

(12) United States Patent
Halme

(10) Patent No.: US 9,563,621 B2
(45) Date of Patent: Feb. 7, 2017

(54) SEARCH BASED USER INTERFACE

(75) Inventor: Jaakko Halme, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 2229 days.

(21) Appl. No.: 12/593,497

(22) PCT Filed: Mar. 28, 2008

(86) PCT No.: PCT/IB2008/000751
§ 371 (c)(1),
(2), (4) Date: Feb. 16, 2010

(87) PCT Pub. No.: WO2008/120081
PCT Pub. Date: Oct. 9, 2008

(65) Prior Publication Data
US 2010/0146441 A1 Jun. 10, 2010

Related U.S. Application Data

(60) Provisional application No. 60/909,089, filed on Mar. 30, 2007.

(51) Int. Cl.
G06F 3/048 (2013.01)
G06F 17/27 (2006.01)
G06F 3/023 (2006.01)
G06F 3/0482 (2013.01)
(Continued)

(52) U.S. Cl.
CPC ........... *G06F 17/276* (2013.01); *G06F 3/0237* (2013.01); *G06F 3/0482* (2013.01); *G06F 17/30967* (2013.01); *H04M 1/274558* (2013.01)

(58) Field of Classification Search
CPC ............... G06F 2207/025; G06F 17/21; G06F 17/30675; G06F 17/30554; G06F 17/30864; G06F 17/3097; G06F 3/0237; G06F 17/30477; G10L 15/187; G10L 13/02; G10L 15/065; G10L 15/1822; G10L 15/19; G10L 15/26; G10L 15/265; G10L 17/26; G10L 2015/025; H04L 67/02; H04L 63/08; H04L 63/102; H04L 63/1416; H04L 63/168
See application file for complete search history.

(56) References Cited

U.S. PATENT DOCUMENTS 6,288,718 B1 9/2001 Laursen et al.
6,320,943 B1* 11/2001 Borland ................... 379/112.01
7,505,985 B2* 3/2009 Kilroy
(Continued)

FOREIGN PATENT DOCUMENTS

CN 1222242 A 7/1999
CN 1745383 A 3/2006
(Continued)

OTHER PUBLICATIONS

International Search Report and Written Opinion for Application No. PCT/IB2008/000751 dated Jul. 29, 2008.
(Continued)

Primary Examiner — Jeffrey A Gaffin
Assistant Examiner — Ayesha Huertas Torres
(74) Attorney, Agent, or Firm — Alston & Bird LLP

(57) ABSTRACT

A method including detecting an input to a cellular device, the input corresponding to at least a portion of one or more identifiers corresponding with a respective content stored in the cellular device, displaying on the cellular device a list of the respective content associated with the input and enabling a user to select one or more of the content in the list.

19 Claims, 12 Drawing Sheets

(51) Int. Cl.
*G06F 17/30* (2006.01)
*H04M 1/2745* (2006.01)

(56) References Cited

U.S. PATENT DOCUMENTS

| | | | |
|---|---|---|---|
| 7,822,189 B2* | 10/2010 | Rana et al. | 379/218.01 |
| 8,108,796 B2* | 1/2012 | Jobling et al. | 715/816 |
| 2003/0048897 A1* | 3/2003 | Luo | 379/433.07 |
| 2003/0182279 A1* | 9/2003 | Willows | 707/4 |
| 2004/0153519 A1* | 8/2004 | Stolze | 709/206 |
| 2004/0153527 A1 | 8/2004 | Tosey | |
| 2005/0289109 A1 | 12/2005 | Arrouye et al. | |
| 2006/0035632 A1* | 2/2006 | Sorvari et al. | 455/418 |
| 2006/0101347 A1* | 5/2006 | Runov et al. | 715/764 |
| 2007/0082708 A1* | 4/2007 | Griffin | 455/565 |
| 2007/0143364 A1* | 6/2007 | Chen et al. | 707/203 |
| 2007/0198643 A1* | 8/2007 | Cope | 709/206 |

FOREIGN PATENT DOCUMENTS

| | | |
|---|---|---|
| CN | 1822694 A | 8/2006 |
| EP | 1 691 260 A1 | 8/2006 |
| WO | WO 97/49044 A1 | 12/1997 |
| WO | 03041371 A | 5/2003 |

OTHER PUBLICATIONS

Office Action for Chinese Application No. 2008800097372 dated Jul. 12, 2011, English Text only.
European Office Action dated Jan. 18, 2010.

* cited by examiner

SEARCH BASED USER INTERFACE

CROSS-REFERENCE TO RELATED APPLICATIONS

This application is the National Stage Application of PCT/IB2008/000751, International Filing Date of 28 Mar. 2008, which designated the United States, published on 9 Oct. 2008 as WO 2008/120081 A1, and which claims priority to U.S. Provisional Patent Application Ser. No. 60/909,089, filed on 30 Mar. 2007, the disclosures of which are incorporated herein by reference in their entireties.

BACKGROUND

1. Field

The disclosed embodiments relate to user interfaces, and more particularly, to user interfaces for searching information.

2. Brief Description of Related Developments

As electronic devices become more sophisticated to include larger memories and connectivity options, the functionality of the devices increase and the amount of information that is stored on or accessed by the devices increases. In conventional electronic devices such as, for example, mobile communication devices, the device applications or content items of the device are accessed using an hierarchical menu or folder structure. As the number of menu items increases, navigation through the hierarchical menu structure becomes more and more difficult for a user as the user has to remember which menus and sub menus to access to arrive at a certain device application or content item. As a result, starting separate device applications to use a respective content has become tedious with the user having to navigate the hierarchical menu or folder structures to find the application or content the user is looking for.

It would be advantageous to be able to access a device application or content item without having to navigate through hierarchical menu or folder structures.

SUMMARY

In one embodiment, a method includes detecting an input to a cellular device, the input corresponding to at least a portion of one or more identifiers corresponding with a respective content stored in the cellular device, displaying on the cellular device a list of the respective content associated with the input and enabling a user to select one or more of the content in the list.

In one embodiment, an apparatus includes a display, an input device, a memory, and a processor connected to the display, input device and memory. The processor is configured detect an input in the apparatus, the input corresponding to at least a portion of one or more identifiers corresponding with a respective content stored in the memory, display on the display a list of the respective content associated with the input and enable a user to select one or more of the content in the list, wherein the apparatus is a cellular apparatus.

In another embodiment, a computer program product includes a computer useable medium having computer readable code means embodied therein for causing a computer to activate an application or content item of a cellular device. The computer readable code means in the computer program product includes computer readable program code means for causing a computer to detect an input to the cellular device, the input corresponding to at least a portion of an identifier corresponding with a respective content stored in the cellular device, computer readable program code means for causing a computer to display on the cellular device a list of the respective content associated with the input and computer readable program code means for causing a computer to enable a user to select one or more of the content in the list.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE EXEMPLARY EMBODIMENT(S)

Figure 1:
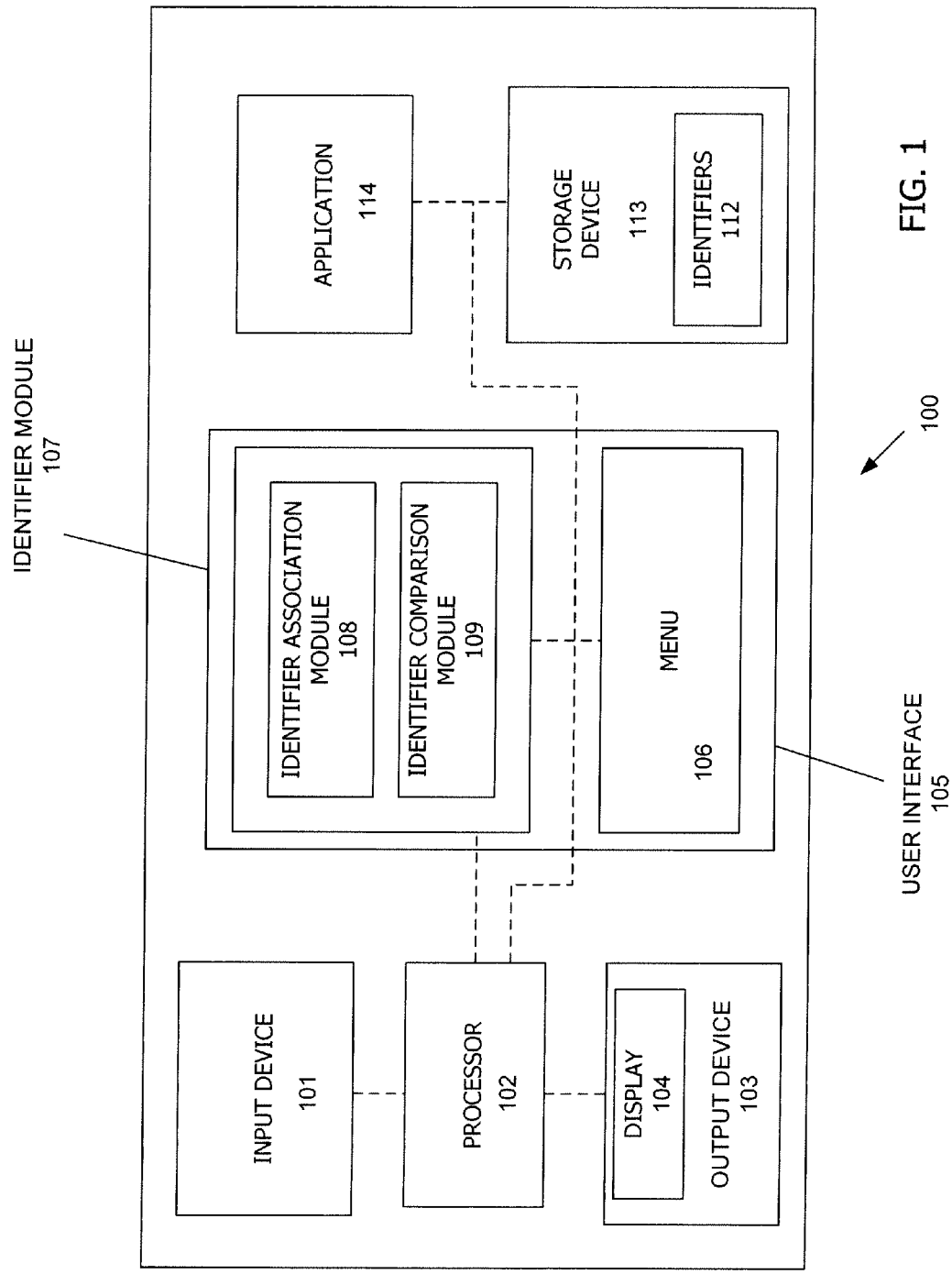
FIG. 1 shows a block diagram of a device in which aspects of the embodiments may be applied.

FIG. 1 shows one embodiment of a system 100 that can be used to practice aspects of the disclosed embodiments. Although the embodiments disclosed will be described with reference to the embodiments shown in the drawings, it should be understood that the embodiments disclosed can be embodied in many alternate forms of embodiments. In addition, any suitable size, shape or type of elements or materials could be used.

The disclosed embodiments generally allow a user to locate content in, or accessible to, a device by inputting keywords or identifiers that are linked to and identify the content. The identifiers are shortcuts that minimize the amount of effort a user exerts to use a content in the device. As the identifiers become more detailed, a list of possible content related to the identifier(s) becomes more refined, allowing a user to parse a search result list and select a desired content.

Devices, such as mobile communications devices, will generally store or have access to a variety of files, applications and programs, and other such resources. Generally, the foregoing will be referred to herein as "content". Some examples of such can include, but is not limited to, device functions, applications, calendars, calendar entries, address books, names in an address book, phone books, phone book entries, spreadsheets, word processors, application files, internet programs and links or bookmarks to related web sites, music/video players and related songs/videos and playlists; device information, current device settings or a status of the device; and connectivity options. In a traditional system, such content is located and accessed by opening a folder or application and scrolling through one or more sub-menus until the desired file or application is located. In the embodiments disclosed herein, each content item can be assigned an identifier. The identifier is unique to the content item and provides a mechanism to locate a particular content item without having to navigate through a folder hierarchy. The type of identifier might only be limited by the input capabilities of the device. Examples of the identifiers may include, but are not limited to, characters, character strings, voice recognition information, graphics, and/or images (collectively referred to herein as "characters"). Characters may include, but are not limited to, numerical text, alphanumeric text, symbols, shapes, and/or any combination thereof. When a user desires to locate a particular content, the user can input one or more characters that make up the identifier for the content. As the inputs are received, the identifier comparison module 109 in the system 100 can identify content on the display 104. If an exact match is not found, the identifier comparison module 109 can identify that content whose identifier starts with, or includes the same character sequence as the user input. A list or menu 106 of content can then be displayed to the user that includes content that has an identifier at least partially corresponding to the input. The user can enter further identifiers and/or search additional characters of the identifiers, which will refine the content list. Only that content will be displayed whose identifier corresponds to the particular sequence of characters entered.

Although the exemplary embodiments herein will be described with reference to the system 100 for exemplary purposes only, it should be understood that the embodiments could be applied equally to any suitable device incorporating, for example, an output device 103, a processor 102, a storage device 113 and supporting software or hardware for implementing aspects of the disclosed embodiments. The user interface 105 of the disclosed embodiments (referred to herein as the "search based user interface") includes a search function or application 114 that may allow a user to search any suitable medium such as for example, a storage device 113 of the device 100 so that the user can find an application or content item the user is looking for without having to navigate through several hierarchical menus or folders. The system 100 may have a standby or idle mode that is activated when the device is not in use (e.g. when the user is not making a call or otherwise operating the device) and an active mode for when the device is in use. The device may also include information that is stored on a memory of the device or links to information that can be accessed through the device by, for example, any suitable connection such as a wired or wireless connection. This information may be accessed with the user interface of the disclosed embodiments when the user interface is initiated from either the idle or active modes as described below.

Figure 2:
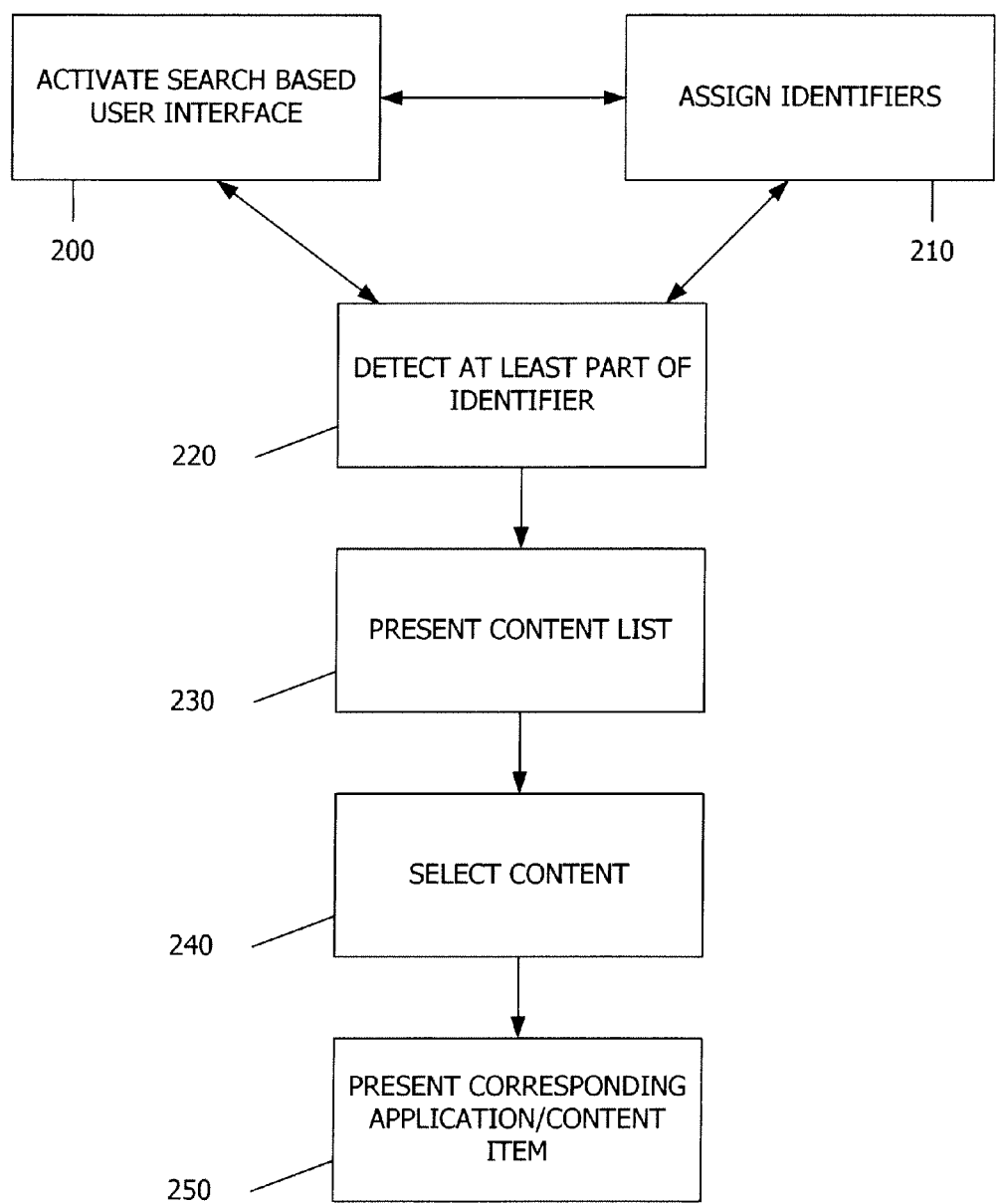
FIG. 2 is a block diagram of a method in accordance with an embodiment.

In one embodiment, a user may use the input device 101 of the system 100 to activate the search based user interface from either the idle or active modes (FIG. 2, Block 200). The identifier association module 108 may allow the user to assign identifiers to content of the device 100 using the input device so that a shortcut is created allowing the user to access the content with a minimized user interaction or number of inputs (FIG. 2, Block 210). In one embodiment, the identifiers may be assigned automatically. The system 100 could initially parse the application or content and pull out certain information, such as for example, a first and last name of a contact in an address book, a radio station name, etc. The information could be predetermined or randomly selected, depending on the application. Identifiers including, but not limited to radio station names, website names and names and/or descriptions of content accessed by the device may be assigned when that content is accessed. For example, when a user accesses a British Broadcasting Company news website the system 100 may automatically assign an identifier to this website. In other embodiments, the system may track a number of times a content item is accessed. After the content has been accessed a predetermined number of time an identifier may automatically be assigned to that content. As the identifiers are assigned in the system 100, the identifiers are stored in a repository 112 in the storage device 113 of the system 100. The system 100 may be configured to index the identifiers in any suitable manner in the repository 112 so that a user may review the list of identifiers. For example, the identifiers may be indexed alphanumerically or by date. As applications or content items are added to or removed from the system 100 the processor 102, for example, may automatically update the repository 112 so that the identifier list includes identifiers that correspond to current device applications and content items. The user may also be able to access the list of identifiers to manually remove identifiers.

In this example, the user of the system 100 assigns one or more identifiers to a content item or device application that is to be accessed directly. An association may be made between the identifiers and the respective content item through the identifier association module 108. The identifiers can be assigned in any suitable manner, such as through for example an "options" feature or menu of the system 100. The identifiers can be used to prioritize frequently used applications or content items so they can be accessed with a minimal number of keystrokes. In other embodiments, the identifiers may be assigned programmatically such as when an application is installed on the device, a pre-assigned identifiers corresponding to that application is added to the list of identifiers. The addition of the programmatic identifier to the list of identifiers may be automatic or upon instruction by the user via, for example a prompt to add the identifiers during the installation of the application. In other embodiments the identifiers may be provided in the system 100 by the manufacturer of the system.

Figure 3A:
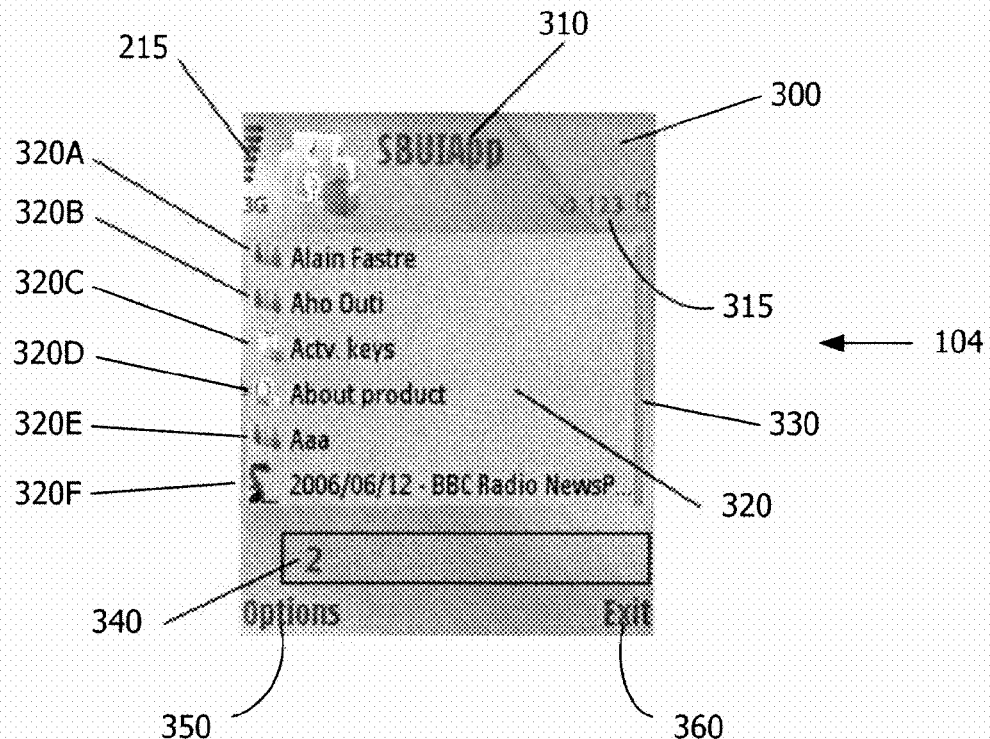
FIGS. 3A-3E are screen shots presented on a device incorporating features of an embodiment.

Referring to FIGS. 3A-E, one example of a search using the system 100 of the disclosed embodiments is illustrated. As shown in FIG. 3A, the user enters the number "2" as the initial search criteria. In this example the system 100 recognizes the number "2" as corresponding to the numeral "2" a well as the letters "a", "b", and "c" which correspond to the "2" key on for example, a numeric, an alphanumeric, T-9, QWERTY or ITU-T (International Telecommunication Union—Telecommunication Standardization) keypad of the system 100. The initial search criteria may be any portion of the identifier such as, for example, only the first character(s) of the identifier or all the characters of the identifier. The system 100, may detect the input characters and the identifier comparison module 109 compares the input characters with, for example, the identifiers stored in the repository 112 and identifies all content that has the number "2" or one of the corresponding letters as its identifier or has an identifier that starts with the number "2" or one of the corresponding letters. (FIG. 2, Block 220). As shown in FIG. 3A, a list 320 is presented, through for example the display 104, that presents relevant content corresponding to the initial search criteria (FIG. 2, Block 230). If the desired content item is shown in the list 320 the user may select the content item as will be described in greater detail below. If the desired content item is not shown in the list 320 the user may narrow down the list 320 by entering additional characters of the identifier.

Figure 3B:
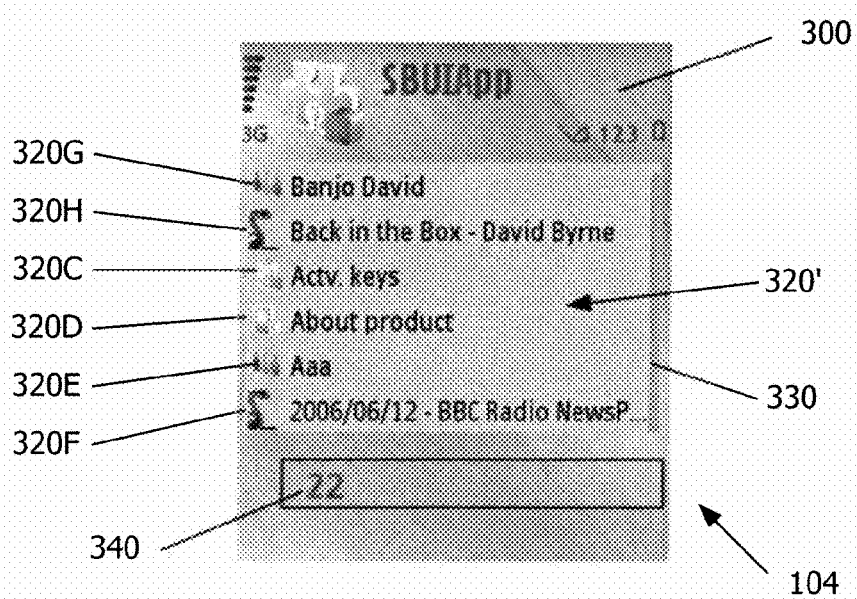

As shown in FIG. 3B the user has entered a second "2" as a first additional search criteria. The system 100 may parse the list 320 according to the additional search criteria and present a second list 320'. The second list 320' now presents that content whose identifier starts with the sequence "22" or any two of the corresponding letters. If the desired content item is shown in the second list 320' the user may select the content item. If the desired content item is not shown in the list 320" the user may narrow down the list 320 by entering additional characters of the identifier.

Figure 3C:
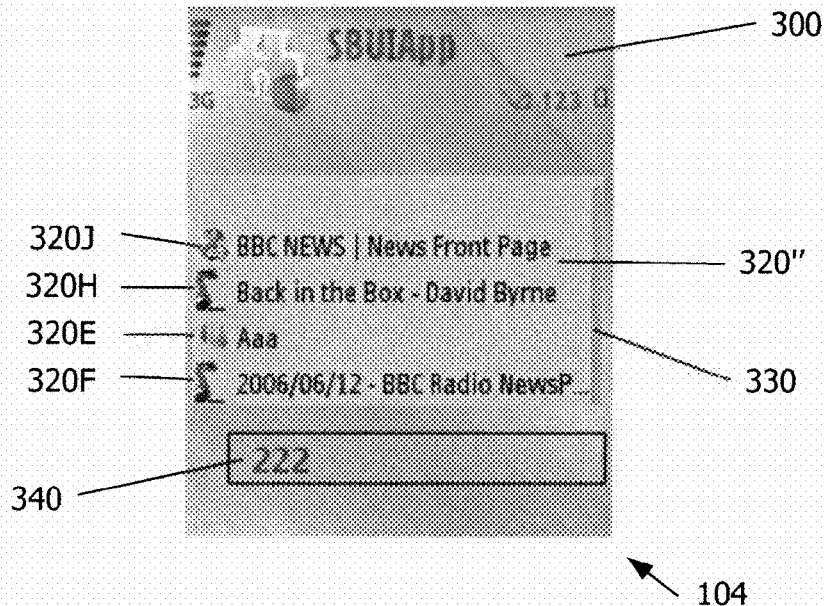

As shown in FIG. 3C the user has entered a third "2" as second additional search criteria. The system 100 may parse the second list 320' according to the second additional search criteria and present a third list 320". The third list 320" now presents that content whose identifier starts with the sequence "222" or any three of the corresponding letters. If the desired content item is shown in the third list 320" the user may select the content item. If the desired content item is not shown in the list 320" the user may narrow down the list 320" even further by entering additional characters of the identifier. The content list can be narrowed down any suitable number of times.

Still referring to FIGS. 3A-E, an example of a search using the system 100 will be described in greater detail. It is noted that the search based user interface can be implemented through any suitable user interface of the system including, but not limited to, the Nokia series 60 or series 40 user interfaces/platforms. For example, the user interfaces in which the search base user interface 300 may be utilized may provide a user a menu that displays applications or content that are available to a user. The user may be able to organize the applications or content into a preferred order in the menu and to categorize the application or content into folders. The user interface may include an active idle (i.e. a dynamic idle state of the system 100) that allows shortcuts to be defined for the most commonly used applications. These shortcuts may be in the form of the identifiers described herein.

In the example shown in FIG. 3A, items presented in the list 320 correspond to device content shown on the display 104 that includes, but is not limited to, names 320A, 320B, 320E in, for example, an address book, device functionality 320C such as which keys are active on the device, device or product information 320D and music files 320F. In other embodiments, the identifiers may be displayed in a list of the search based user interface 300 in a manner similar to that described for the content item list 320. The identifiers can be any suitable indicators for identifying an application or content item that the user can input using, for example, the input device 101 of the system 100. In one embodiment, the system 100 may be configured for voice recognition so that the identifiers can be entered through a microphone of the system 100.

When the search based user interface 300 is active the system detects at least part of the identifier(s) entered by the user using an input 101 of the device 100. As can be seen in FIG. 3A, in this example the device is set for a numeric input so the search based user interface 300 can be used without having to start an application in the device that allows alphanumeric input. In other embodiments the device may be configured to use any suitable input method including, but not limited to numeric input, alphanumeric input, text input and/or voice input for the search based user interface. For example, when the search based user interface 300 is activated a default input method of the search based user interface 300 may be used. The default input method may be user settable and includes any suitable input method such as such as those described above. The device inputs may include, but are not limited to a device keypad, a touch screen display, microphone or a peripheral input device such as external keyboard or touch pad. As can be seen in FIG. 3A, the numeral "two" has been input as a search criteria for an identifier. In this example, the characters of the identifier are generally shown as the text sequence "222" but, in other embodiments can include any of the characters described above. For example, the characters may be alphanumeric characters such as "ABC123" or a series of symbols such as "□◊∘□". As the user inputs characters corresponding to the identifier, the characters are displayed in the input area 340 of the search based application user interface 300. In one embodiment, the input area 340 may indicate characters that are entered using a keypad while in other embodiments the input area 340 may indicate characters that are input using a touch screen display and stylus or a voice recognition feature of the system 100. In still other embodiments the input area may be a touch sensitive area of the display 104 so that the user can input at least part of the identifier directly into the input area 340. In this example, the system 100 is configured to index and display device content corresponding to the characters of the identifier in a text prediction manner, however in other embodiments any suitable input method may be used. The device content may be indexed in the content list 320 in any suitable manner including, but not limited to, alphabetical indexing.

As an example of character input, as shown in FIG. 3A, the letters "A", "B", and "C" correspond to the number "two" key of a T-9 keyboard so that when the "two" key is activated device content having identifiers beginning with the either of the letters "A", "B", and "C" are displayed in the content list 320. In other embodiments, the user may enter a character directly using a T-9 keyboard, QWERTY keyboard or any other suitable keyboard so that device content corresponding to the identifiers beginning with the character entered are displayed in the content list 320. For example, with a QWERTY keyboard, if the user enters the letter "A" device content having identifiers beginning with the letter "A" will be displayed in the keyword list 320. Characters may be entered directly using the T-9 or ITU-T keyboard, for example, the letter "C" can be input by pressing the "two" key three times. In other embodiments the system may have a minimized keypad where the inputs are entered using, for example a single key. For example, a user may press the single key once for the numeral "one", twice for the numeral "two" and so on. The system 100 may detect the number of times the single key has been activated and associate the number of activations with the corresponding numeral and or letters (e.g. the numerals 1-9 may have corresponding letter similar to those found on a T-9 keyboard). In still other embodiments there may be a series of individual light sources such as, for example, light emitting diodes (LEDs) to indicate which search criteria are being input into the system 100. The LEDs may correspond to numbers and/or letters of the alphabet. For example, each number and/or letter may have a corresponding LED that illuminates when a key is activated on the keypad of the system 100. Referring to FIG. 5B, the system 100 may have an input in the form of a rotator input 550. The rotator may include a rotator 560 and a selector 570. The selector may be in the form of a button, key or other touch sensitive surface.

A user may input, for example numbers or letters by rotating the rotator 560 in either a clockwise or counterclockwise direction. For example, as the user rotates the rotator 560 in, for example the clockwise direction the numbers are presented sequentially in an increasing order, e.g. from "0" to "9" and when the rotator 560 is rotated in a counterclockwise directions the numbers are presented in a decreasing manner. When the desired number is reached the user may select the number by activating the selector 570. Letters may also be entered in a similar manner. For example, as the user rotates the rotator 560 in, for example the clockwise direction, the letters in for example, the English alphabet are presented sequentially in an ascending order, e.g. from "A" to "Z" and when the rotator 560 is rotated in a counterclockwise directions the letters are presented sequentially in a descending order, e.g. from "Z" to "A".

When at least one character of the identifier is entered, if the identifier corresponding to the device application or content item the user is searching for is displayed in the content list 320 the user may highlight the content item for selection as will be described below. If the device application or content item the user is searching for is not displayed in the content list 320 the user may scroll through the content list 320 to find a certain content item without having to type to the whole identifier. The user may also narrow down the results shown in the content list 320 to avoid excessive scrolling through the content list 320.

The results of the content item list 320 in FIG. 3A can be narrowed down by entering additional inputs corresponding to additional characters of the identifier corresponding to the content item the user is searching for. For example, referring to FIG. 3B the user may activate the "two" key for a second time so that character string "22" appears in the input area 340. The device indexes the content items and presents a narrowed down list of content items having any one of the letters "A", "B", and "C" as the first and/or second characters of the respective identifier as shown in content item list 320'. In other words, for each key activated by the user, the user is shown an updated or re-indexed list of content items corresponding to the successively input characters of the identifier. In this example, content items 320A, 320B have been replaced with content items 320G, 320H to satisfy the condition of displaying content items having any one of the letters "A", "B", and "C" as the first and/or second characters of their respective identifier. If the device application or content item the user is searching for is displayed in the content list 320' the user may highlight the content item for selection. If the device application or content item the user is searching for is not displayed in the content list 320' the user may further narrow the content list 320' by entering additional characters of the identifier. In this example, the key corresponding to the number "two" is successively activated for a third time such that content items having any one of the letters "A", "B", and "C" as the first, second and/or third characters of their respective identifiers are displayed in the content list 320" as shown in FIG. 3C. As can be seen in FIG. 3C all of the content items 320E, 320F, 320H, 320J displayed have any one of the letters "A", "B", and "C" as either the first, second and/or third characters of their respective identifiers. If the device application or content item the user is searching for is not displayed in the content list 320" the user may further narrow the content list 320" by entering additional characters of the identifier. The content lists can be narrowed down any suitable number of times until the desired content item the user is looking for is displayed. In other embodiments the user may type an entire identifier for directly accessing the application or content item.

Figure 3D:
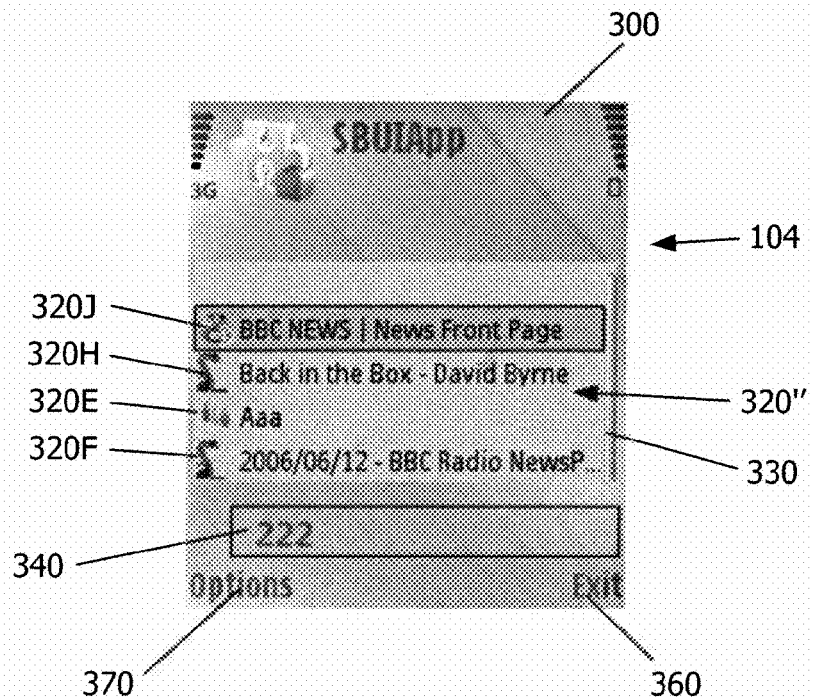

Referring now to FIG. 3D, the content item 320J is highlighted for selection. (FIG. 2, Block 240). The content item 320J may be highlighted for selection in any suitable manner. For example, the content item may be highlighted using the multifunction/scroll key of an input device 101 or with a stylus or the user's finger in cooperation with a touch screen display. The user may also manipulate the scroll bar 330 through the touch screen display or the multifunction key to highlight an item from the content list 320". In one embodiment, when the content item is highlighted it may be selected in any suitable manner such as by, for example, using a multifunction key an "enter" key or by tapping on a touch sensitive display screen. In other embodiments, the search based user interface 300 may provide the user with options, corresponding to the highlighted content item, through for example, a soft key function, a dialog box or a "pop up window" that appears on the display when the item is highlighted or after the item is selected. The soft key functions may be context sensitive to the highlighted application or device content. For example, if a content item corresponding to music or video file is highlighted the options may pertain to playing the video or music file. If a content item corresponding to a website is highlighted the option may pertain to accessing the website or surfing the internet. An options menu may be presented to the user when the soft key function 370 is activated. In other embodiments, the options pertaining to the highlighted content item may be any suitable options that are provided to the user in any suitable manner. The options corresponding to the highlighted content item may allow the user to start or activate a respective application, link, or content item. The options may also allow a user to rename the identifier associated with the content item. In other embodiments a soft key may be provided to allow a user to start or activate the respective application, link or content item directly without the user having to navigate, for example, an options menu.

Figure 3E:
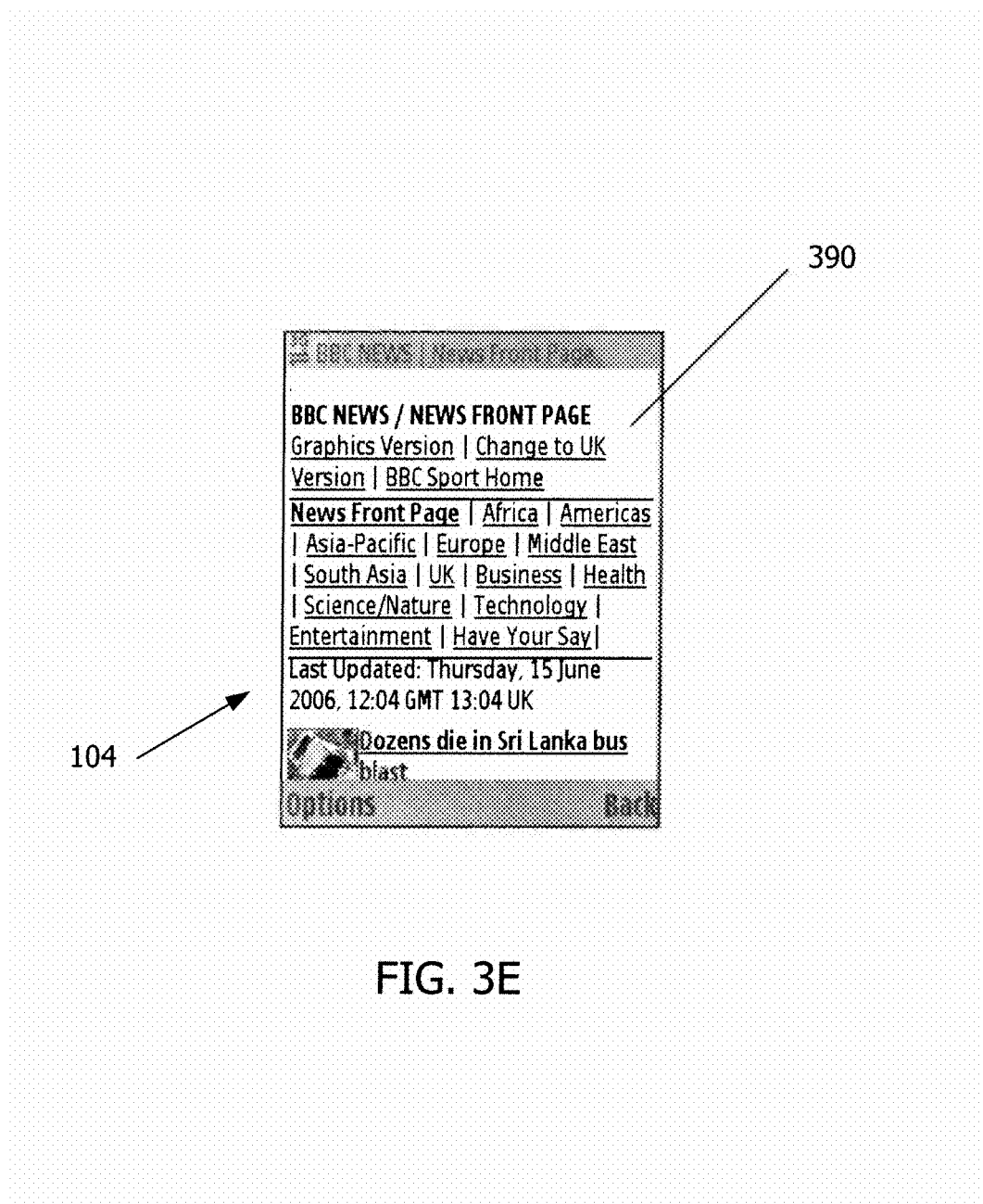

In this example, the content item 320J is activated as can be seen in FIG. 3E. The content item 320J corresponds to a link for a British Broadcasting Company news website 390 (FIG. 3E) such that when the content item 320J is activated the device launches the appropriate device application (in this example the device application is a web browser) so that the news website is displayed on the display 104. (FIG. 2, Block 250). The system may be configured to launch an appropriate device application for any given content item. For example, if content item 320H, which corresponds to a music file, were activated the device would launch a music player so that the music file corresponding to content item 320H is played.

Figure 4:
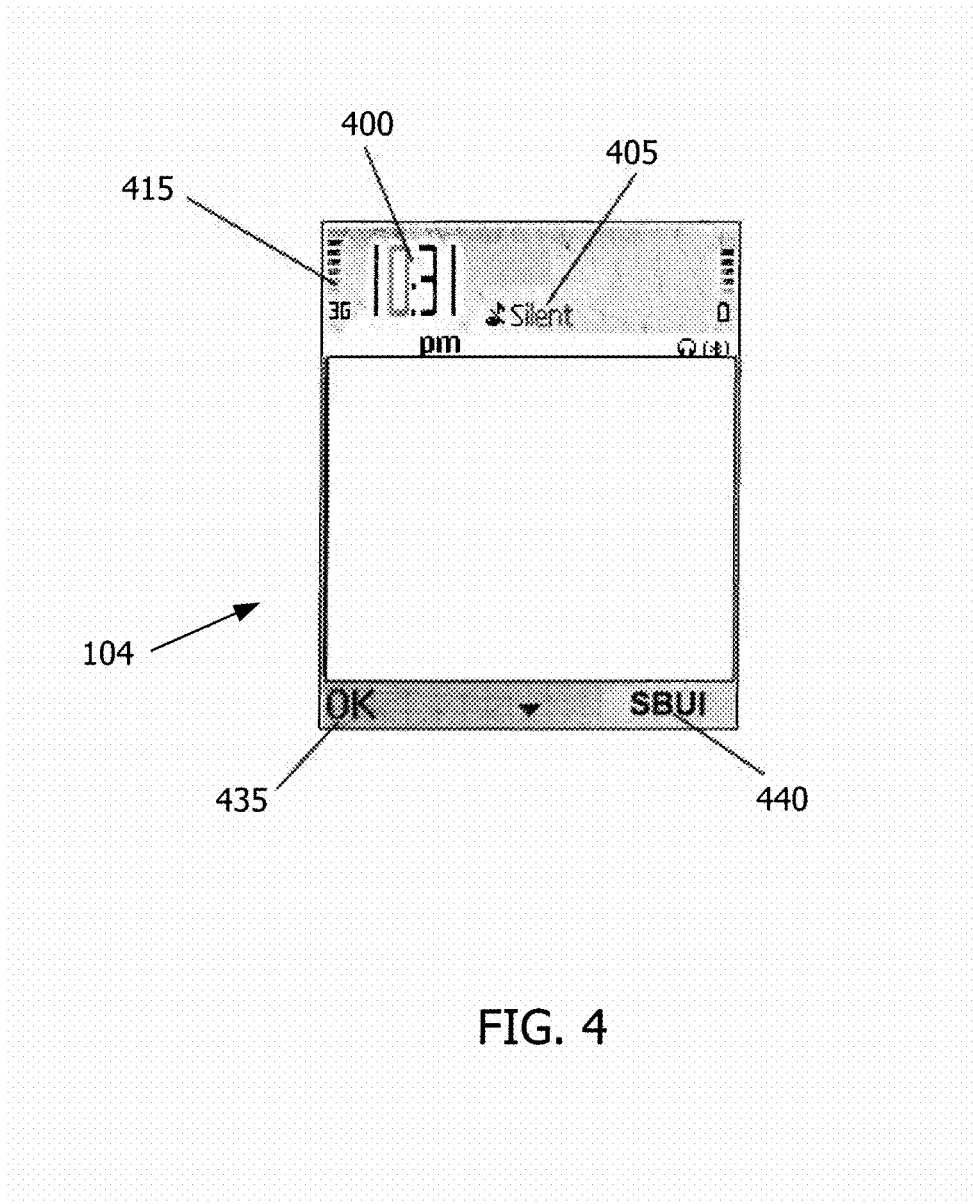
FIG. 4 shows an exemplary display of a device incorporating features of an embodiment.

Referring now to FIG. 4, exemplary information that may be displayed on the display 104 of the system 100 is illustrated. The display 104 may include any suitable information such as for example, a service signal strength indicator 415, the active ringing or alert mode for incoming calls and/or messages 405, the time 400 and soft key functions 435, 440. In other embodiments, the system 100 may have a minimized display where only one line or a partial line of characters is shown. In other embodiments any suitable numbers of lines of characters may be included in the display. In still other embodiments, the system may have only an audible output device 103 where the results of the search using the search based user interface are audibly presented to the user. For example, as the user enters the search criteria, audible feedback may be provided to the user as to what search criteria is being entered. The user may use, for example, keys of the keypad of the system 100 to scroll through the search results where each content item in the search results is audibly presented to the user as the user scrolls over that content item.

The information shown in FIG. 4 may be displayed on the display 104 when the device is in either of the standby mode or active mode. In other embodiments any suitable information may be displayed on the device when the device is in an active or standby mode. In one embodiment, such as when the system 100 is in the standby mode, the search based user interface may become active when a user of the system 100 presses or activates any suitable key or interacts with the system 100 in any other manner such as, for example, through a touch screen display or a peripheral device. In another embodiment, such as when the system 100 is in an active mode, one of the soft keys may provide the user with an option 440 for activating the search based user interface of the system 100. In still other embodiments, the search based user interface may be activated and/or presented to the user in any suitable manner.

Referring again to FIGS. 3A-3E, exemplary information that may be displayed when the search based application user interface 300 is activated will be described. When the search based user interface 300 is activated, either from the standby mode or active mode of the system 100 as described above, the display 104 switches from, for example, the display screen shown in FIG. 4 to the search based user interface display screen shown in FIG. 3A. In other embodiments, the display may switch from any suitable display screen to the search based user interface screen. Some or all of the information of the display screen in FIG. 4 may also be displayed in the search based user interface 300. As can be seen in FIG. 3A, the search based user interface may include any suitable information including, but not limited to, an application indicator 310, which in this case "SBUI-App" indicates the search based user interface 300 is active, a list of applications 320 that correspond to the identifiers, a content list scroll bar 330, an input area 340, an indicator of the type of input the device is set for 315 and soft key functions 350 and 360. The soft key functions may provide the user with an options function 350 and a way to exit 360 the search based user interface 300. The options function 350 may include any suitable options for the search based user interface 300 including, but not limited to, options for the graphical layout of the interface (e.g. positioning, information/content to be included in the interface, coloring, etc.), an identifier association option so the user can define identifiers as will be described below and options for setting the type of input.

Figure 5A:
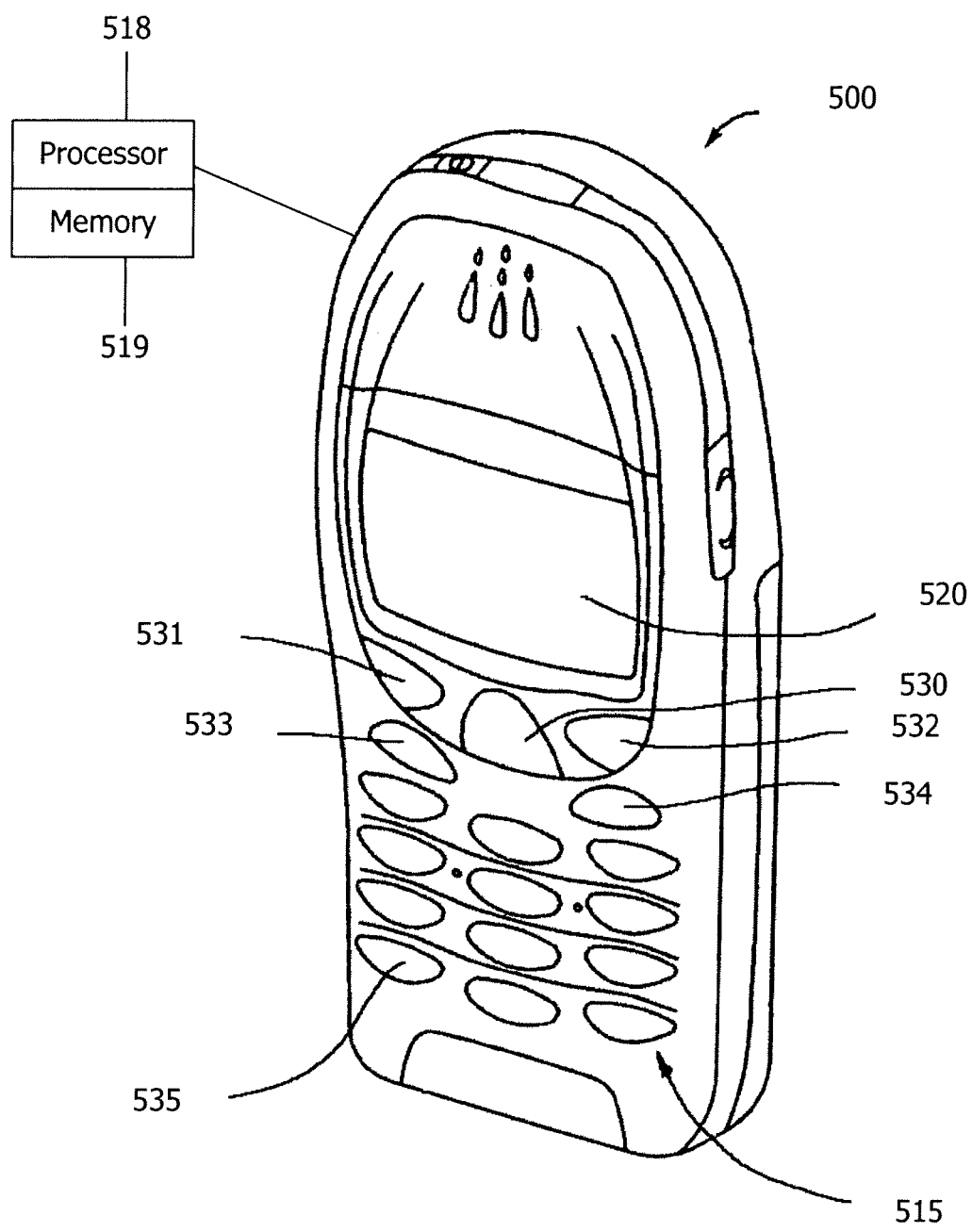
FIG. 5A illustrates a device incorporating features of an embodiment.
Figure 5B:
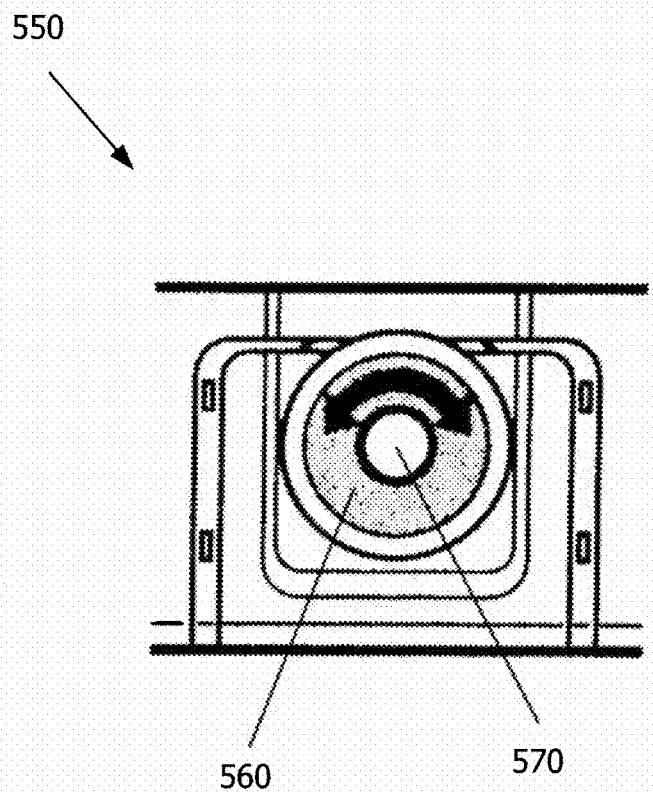
FIG. 5B illustrates an input of a device incorporating features of an embodiment.

Referring to FIG. 5A, the system 100 may be any suitable device such as a mobile communications device or terminal. In One embodiment the system 100 may be a mobile or cellular phone 500. The terminal 500 may have a keypad 510 and a display 520. The keypad 510 may include any suitable keypad such as one or more of a numeric, an alphanumeric, T-9, QWERTY or ITU-T keypad. For example, the keypad 510 may include any suitable user input devices such as, for example, a multi-function/scroll key 530, soft keys 531, 532, a call key 533 and end call key 534 and alphanumeric keys 535. The input of the mobile phone 500 may also include any of those inputs/user interfaces described above in combination with or in lieu of the keypad 510. The display 520 may be any suitable display, such as for example, a touch screen display or graphical user interface. The display may be integral to the device 500 or the display may be a peripheral display connected to the device 500. A pointing device, such as for example, a stylus, pen or simply the user's finger may be used with the display 520. In alternate embodiments any suitable pointing device may be used. In other alternate embodiments, the display may be a conventional display. The device 500 may also include other suitable features such as, for example, a camera, loud speaker, connectivity port or tactile feedback features. The mobile communications device may have a processor 518 connected to the display for processing user inputs and displaying information on the display 520. A memory 519 may be connected to the processor 518 for storing any suitable information and/or applications associated with the mobile communications device 500 such as phone book entries, calendar entries, web browsers, keywords, etc.

Figure 6:
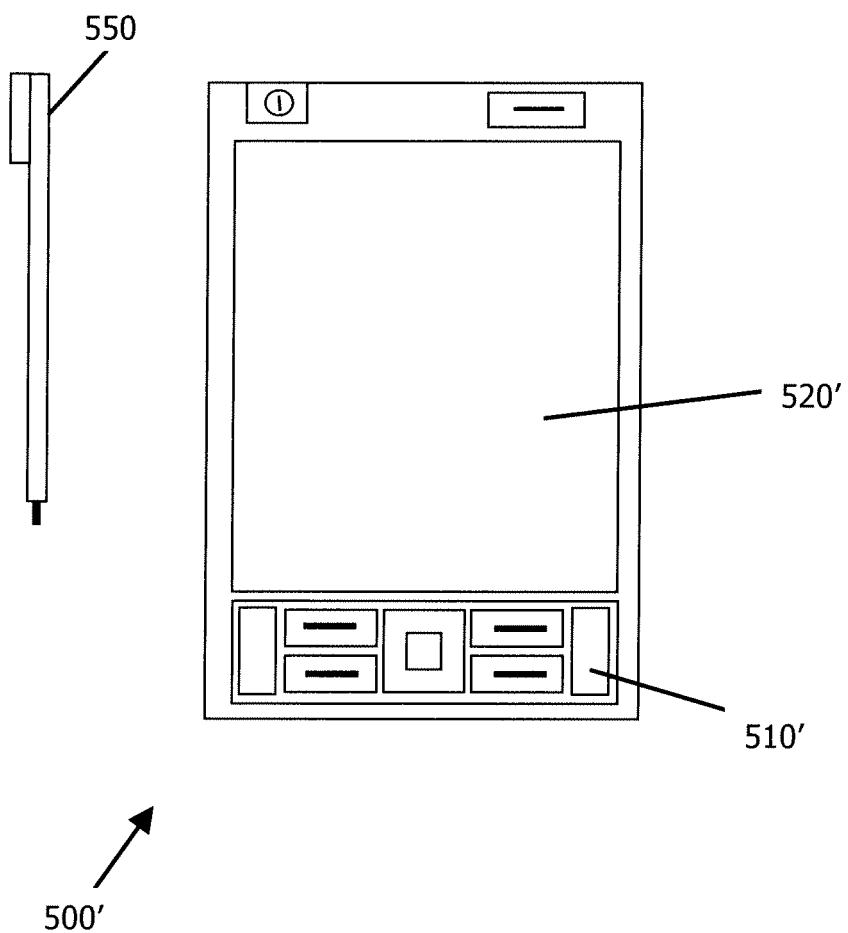
FIG. 6 illustrates another device incorporating features of an embodiment.

In one embodiment, referring to FIG. 6, the system 100 may be a PDA style device 500'. The PDA 500' may have a keypad 510', a touch screen display 520' and a pointing device 550 for use on the touch screen display 520'. In still other alternate embodiments, the device may be a personal communicator, a tablet computer, a laptop or desktop computer, a television or television set top box or any other suitable device capable of containing the display 520 and supported electronics such as the processor 518 and memory 519.

Figure 7:
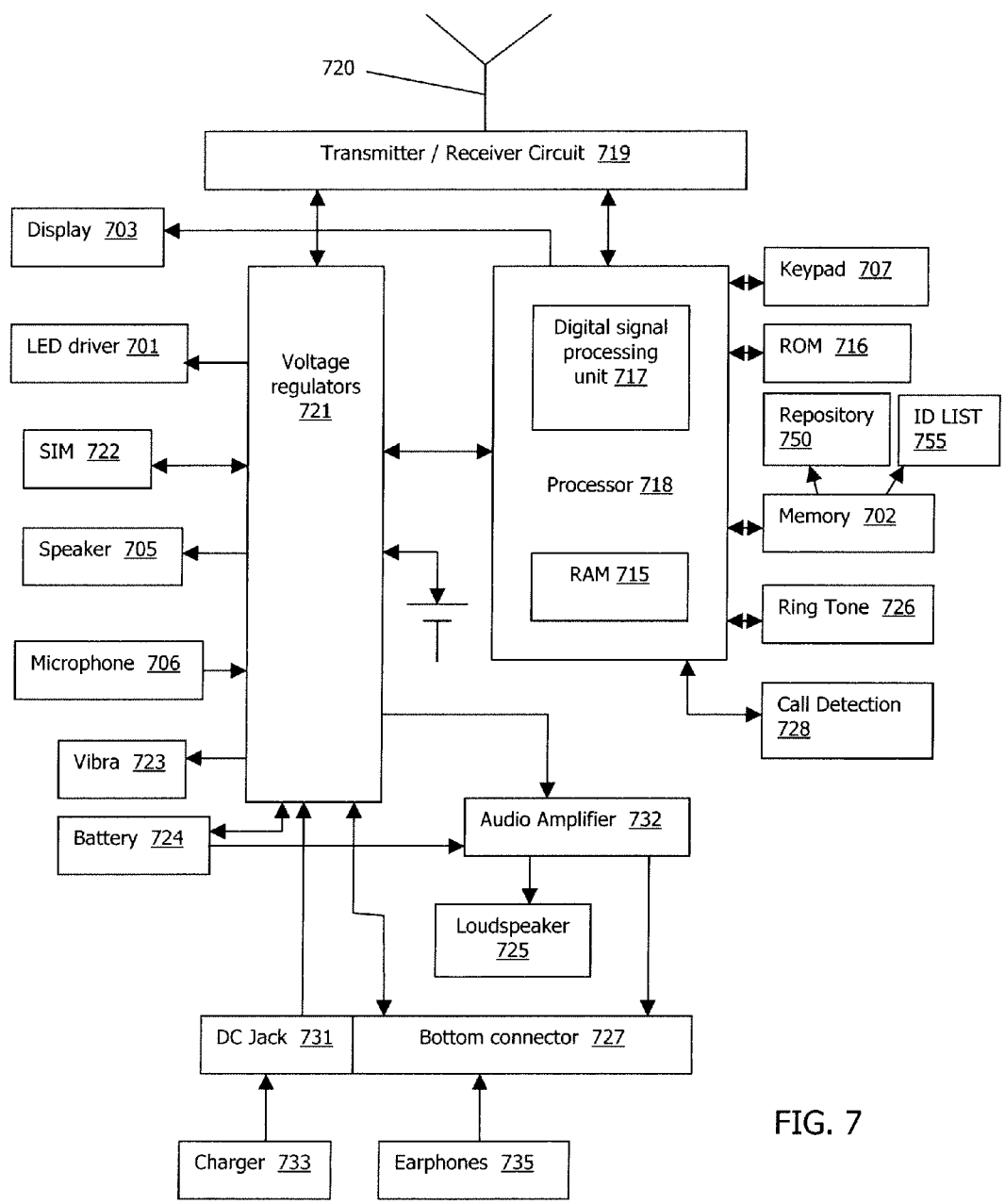
FIG. 7 is another block diagram illustrating the general architecture of a system in which aspects of the embodiments may be applied.

FIG. 7 illustrates in block diagram form one embodiment of a general architecture of the system 100. The system 100 may have a processor 718 connected to the display 703 for processing user inputs and displaying information on the display 703. The processor 718 controls the operation of the device and can have an integrated digital signal processor 717 and an integrated RAM 715. The processor 718 controls the communication with a cellular network via a transmitter/receiver circuit 719 and an antenna 720. A microphone 706 is coupled to the processor 718 via voltage regulators 721 that transform the user's speech into analog signals. The analog signals formed are A/D converted in an A/D converter (not shown) before the speech is encoded in the DSP 617 that is included in the processor 718. The encoded speech signal is transferred to the processor 718, which e.g. supports, for example, the GSM terminal software. The digital signal-processing unit 717 speech-decodes the signal, which is transferred from the processor 718 to the speaker 705 via a D/A converter (not shown).

The voltage regulators 721 form the interface for the speaker 705, the microphone 706, the LED drivers 701 (for the LEDS backlighting the keypad 707 and the display 703), the SIM card 722, battery 724, the bottom connector 727, the DC jack 731 (for connecting to the charger 733) and the audio amplifier 732 that drives the (hands-free) loudspeaker 725.

The processor 718 can also include memory 702 for storing any suitable information and/or applications associated with the system 100 such as phone book entries, calendar entries, keywords etc. The memory may include the identifier repository 750 and a list of identifiers 755.

The processor 718 also forms the interface for peripheral units of the device, such as for example, a (Flash) ROM memory 716, the graphical display 703, the keypad 707, a ringing tone selection unit 726, and an incoming call detection unit 728. In alternate embodiments, any suitable peripheral units for the system 100 can be included.

The software in the RAM 715 and/or in the flash ROM 716 contains instructions for the processor 718 to perform a plurality of different applications and functions such as, for example, those described herein.

Figure 8:
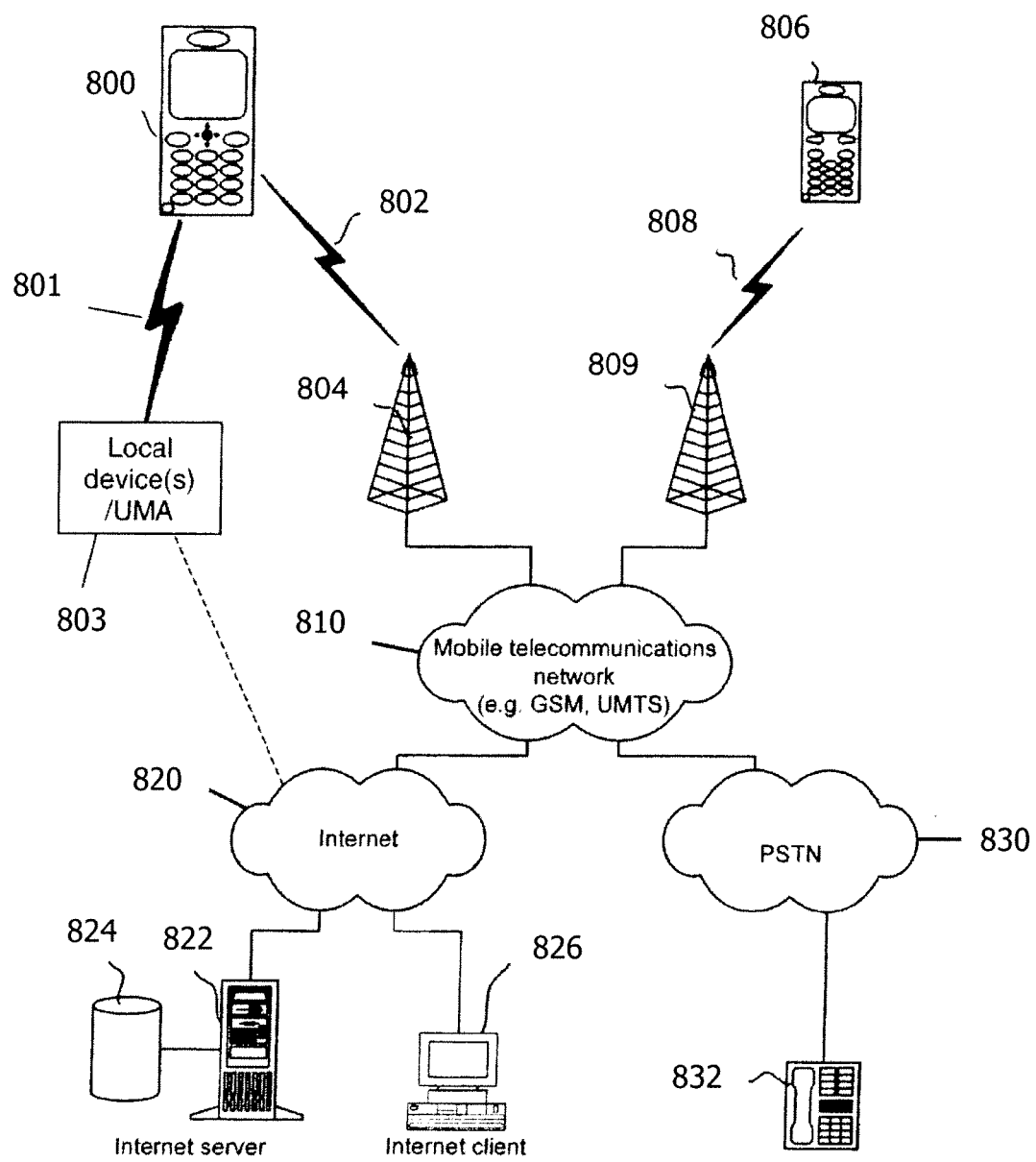
FIG. 8 is a schematic illustration of a cellular telecommunications system, as an example, of an environment in which a communications device incorporating features of an exemplary embodiment may be applied.

FIG. 8 is a schematic illustration of a cellular telecommunications system, as an example, of an environment in which a communications device 800 incorporating features of an embodiment may be applied. Communication device 800 may have features that are substantially similar to that described above with respect to system 100. In the telecommunication system of FIG. 8, various telecommunications services such as cellular voice calls, www/wap browsing, cellular video calls, data calls, facsimile transmissions, music transmissions, still image transmission, video transmissions, electronic message transmissions and electronic commerce may be performed between the mobile terminal 800 and other devices, such as another mobile terminal 806, a stationary telephone 832, or an internet server 822. It is to be noted that for different embodiments of the mobile terminal 800 and in different situations, different ones of the telecommunications services referred to above may or may not be available. The aspects of the invention are not limited to any particular set of services in this respect.

The mobile terminals 800, 806 may be connected to a mobile telecommunications network 810 through radio frequency (RF) links 802, 808 via base stations 804, 809. The mobile telecommunications network 810 may be in compliance with any commercially available mobile telecommunications standard such as GSM, UMTS, D-AMPS, CDMA2000, FOMA and TD-SCDMA.

The mobile telecommunications network 810 may be operatively connected to a wide area network 820, which may be the internet or a part thereof. An internet server 822 has data storage 824 and is connected to the wide area network 820, as is an Internet client computer 826. The server 822 may host a www/hap server capable of serving www/hap content to the mobile terminal 800.

For example, a public switched telephone network (PSTN) 830 may be connected to the mobile telecommunications network 810 in a familiar manner. Various telephone terminals, including the stationary telephone 832, may be connected to the PSTN 830.

The mobile terminal 800 is also capable of communicating locally via a local link 801 to one or more local devices 803. The local link 801 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 803 can, for example, be various sensors that can communicate measurement values to the mobile terminal 800 over the local link 801. The above examples are not intended to be limiting, and any suitable type of link may be utilized. The local devices 803 may be antennas and supporting equipment forming a WLAN implementing Worldwide Interoperability for Microwave Access (WiMAX, IEEE 802.16), WiFi (IEEE 802.11x) or other communication protocols. The WLAN may be connected to the internet. The mobile terminal 800 may thus have multi-radio capability for connecting wirelessly using mobile communications network 810, WLAN or both. Communication with the mobile telecommunications network 810 may also be implemented using WiFi, WiMax, or any other suitable protocols, and such communication may utilize unlicensed portions of the radio spectrum (e.g. unlicensed mobile access (UMA)).

Figure 9:
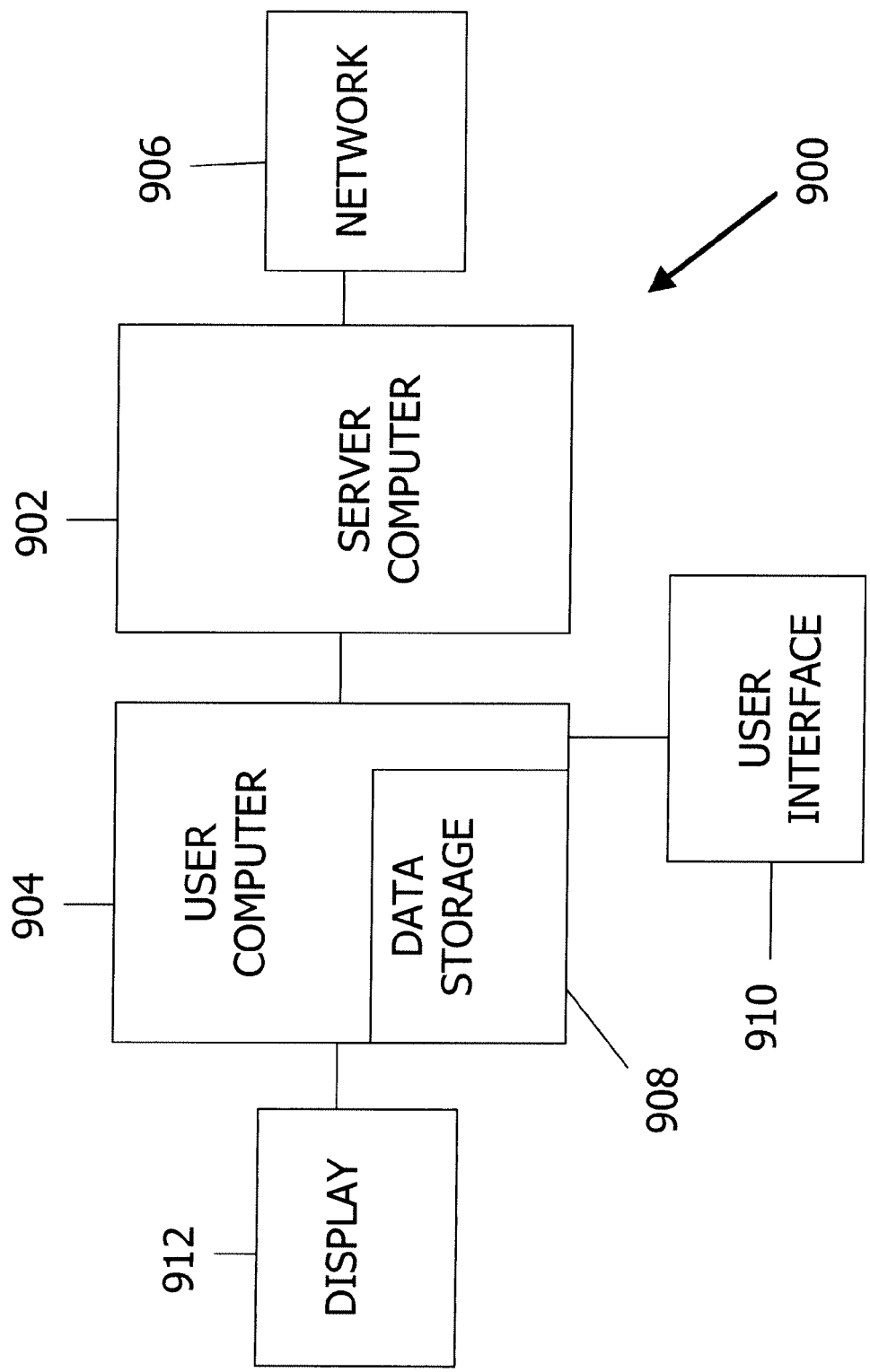
FIG. 9 illustrates a block diagram of one embodiment of a typical apparatus incorporating features that may be used to practice aspects of an embodiment.

The disclosed embodiments may also include software and computer programs incorporating the process steps and instructions described herein that are executed in different computers. FIG. 9 is a block diagram of one embodiment of a typical apparatus 900 incorporating features that may be used to practice aspects of the embodiments. As shown, a computer system 902 may be linked to another computer system 904, such that the computers 902 and 904 are capable of sending information to each other and receiving information from each other. In one embodiment, computer system 902 could include a server computer adapted to communicate with a network 906. Computer systems 902 and 904 can be linked together in any conventional manner including, for example, a modem, hard wire connection, or fiber optic link. Generally, information can be made available to both computer systems 902 and 904 using a communication protocol typically sent over a communication channel or through a dial-up connection on ISDN line. Computers 902 and 904 are generally adapted to utilize program storage devices embodying machine readable program source code which is adapted to cause the computers 902 and 904 to perform the method steps disclosed herein. The program storage devices incorporating aspects of the invention may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 902 and 904 may also include a microprocessor for executing stored programs. Computer 902 may include a data storage device 908 on its program storage device for the storage of information and data. The computer program or software incorporating the processes and method steps incorporating aspects of the invention may be stored in one or more computers 902 and 904 on an otherwise conventional program storage device. In one embodiment, computers 902 and 904 may include a user interface 910, and a display interface 912 from which aspects of the invention can be accessed. The user interface 910 and the display interface 912 can be adapted to allow the input of queries and commands to the system, as well as present the results of the commands and queries.

The embodiments described herein, which can be implemented individually or in any combination thereof, provide an intuitive user interface that allows a user of an electronic device to access and use the ever increasing amount of content and functionality of evolving electronic devices with a minimum number of keystrokes. The user interface of the disclosed embodiments includes a search function that may allow a user to search any suitable medium such as for example, a storage device 113 of the system 100 so that the user can find an application or content item the user is looking for without having to navigate through several hierarchical menus or folders. A user may employ the search based user interface to search for suitable applications or content items stored in the device. The search based user interface may also allow the user to search for any suitable information on the Internet or World Wide Web via, for example bookmarks or links to the Internet content. In other embodiments, the search based user interface may allow a user to search the contents of other external or peripheral devices including, but not limited to, computers, mobile phones, personal digital assistants, memory cards for applications or content when the system 100 is in the standby or active mode. The other devices may be searchable via any suitable wired or wireless communications link including but not limited to bluetooth, infrared, optical and cellular communications. The search based user interface of the disclosed embodiments allows a user to access and use any application or content item with a minimized number of keystrokes regardless of where the application or content item is placed in a menu structure.

It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method comprising:
when a content is accessed, automatically assigning, by a system, one or more search identifiers to the respective content which is accessed for comparison with one or more search inputs during a subsequent search operation to allow for searching of the respective content, wherein the one or more search identifiers are stored in the system and the respective content is stored in or accessible by the system;
detecting, by the system, a search input to the system as part of the subsequent search operation;
comparing, by the system, the detected search input with the one or more stored search identifiers;
determining, by the system, stored search identifiers which at least partially correspond to the detected search input;
displaying, on the system, a list of the respective content associated with the determined stored search identifiers; and
enabling, by the system, a user to select one or more of the content in the list.

2. The method of claim 1, further comprising:
detecting, by the system, at least one subsequent search input to the system; and
parsing, by the system, the list to include only that content having at least a partial search identifier sequence corresponding to the search input and the at least one subsequent search input.

3. The method of claim 1, wherein the content corresponds to names in address books, calendars, calendar entries, phone books, phone book entries, spreadsheets, word processors, application files, internet programs and links or bookmarks to related web sites, music/video players and related songs/videos and playlists, device information and connectivity options.

4. The method of claim 1, wherein the one or more search identifiers include images, numerical text, alphanumeric text, symbols, shapes, and/or any combination thereof, the identifiers forming a persons name, the name of an application or content, the name of an external device or a peripheral device, a description of the application, a description of the content, a description of the external device or a description of the peripheral device.

5. The method of claim 1, wherein selecting the content causes context sensitive options corresponding to an application associated with the content to be displayed.

6. The method of claim 1, wherein the one or more search identifiers are stored in an indexed list in a memory of the system.

7. The method of claim 1, wherein the content is selected directly, without the need for navigating through hierarchical menu or folder structures.

8. The method of claim 1, further comprising opening, by the system, an application associated with the content, wherein the application is stored in a memory of the system or in device external to the system.

9. The method of claim 1, wherein the system comprises one or more of a cellular phone, a mobile communications device, a terminal, a personal digital assistant (PDA), a personal communicator, a tablet computer, a laptop computer, a desktop computer, a television, a television set top box, a server and a device in communication with any of the aforementioned devices.

10. An apparatus comprising:
a display;
an input device;
a memory; and
a processor connected to the display, input device and memory, wherein the processor is configured to: when a content is accessed, automatically assign one or more search identifiers to the respective content which is accessed for comparison with one or more search inputs during a subsequent search operation to allow for searching of the respective content, wherein the one or more search identifiers and the respective content are stored in the memory or a device accessible by the apparatus; detect a search input to the apparatus as part of the subsequent search operation; compare the detected search input with the one or more stored search identifiers; determine stored search identifiers which at least partially correspond to the detected search input; display on the display a list of the respective content associated with the determined stored search identifiers; and enable a user to select one or more of the content in the list
wherein the apparatus is a cellular apparatus.

11. The apparatus of claim 10, wherein the processor is further configured to detect at least one subsequent search input in the apparatus and parse the list of the respective content to include only that content having at least a partial search identifier sequence corresponding to the search input and the at least one subsequent search input.

12. The apparatus of claim 10, wherein the content corresponds to names in address books, calendars, calendar entries, phone books, phone book entries, spreadsheets, word processors, application files, internet programs and links or bookmarks to related web sites, music/video players and related songs/videos and playlists, device information and connectivity options.

13. The apparatus of claim 10, wherein the one or more search identifiers include images, numerical text, alphanumeric text, symbols, shapes, and/or any combination thereof, the identifiers forming a persons name, the name of an application or content, the name of an external device or a peripheral device, a description of the application, a description of the content, a description of the external device or a description of the peripheral device.

14. The apparatus of claim 10, wherein the processor is configured to display context sensitive options corresponding to an application associated with the content when the content is selected.

15. The apparatus of claim 10, wherein the one or more search identifiers are stored in an indexed list in the memory of the apparatus.

16. The apparatus of claim 10, wherein the content is selected directly, without the need for navigating through hierarchical menu or folder structures.

17. The apparatus of claim 10, wherein the processor is further configured to open an application associated with the content, wherein the application is stored in the memory of the apparatus or in a device external to the apparatus.

18. The apparatus of claim 10, wherein the apparatus comprises one or more of a cellular phone, a mobile communications device, a terminal, a personal digital assistant (PDA), a personal communicator, a tablet computer, a laptop computer, a desktop computer, a television, a television set top box, a server and a device in communication with any of the aforementioned devices.

19. A non-transitory computer program product comprising computer readable program code for:
   compu when a content is accessed, automatically assigning, by a system, one or more search identifiers to the respective content which is accessed for comparison with one or more search inputs during a subsequent search operation to allow for searching of the respective content, wherein the one or more search identifiers are stored in the system and the respective content is stored in or accessible by the system;
   compu detecting, by the system, search input to the system as part of the subsequent search operation;
   comparing, by the system, the detected search input with the one or more stored search identifiers;
   determining, by the system, stored search identifiers which at least partially correspond to the detected search input;
   displaying, on the system, a list of the respective content associated with the determined stored search identifiers; and
   enabling, by the system, a user to select one or more of the content in the list.

* * * * *

UNITED STATES PATENT AND TRADEMARK OFFICE
CERTIFICATE OF CORRECTION

| | | |
|---|---|---|
| PATENT NO. | : 9,563,621 B2 | Page 1 of 1 |
| APPLICATION NO. | : 12/593497 | |
| DATED | : February 7, 2017 | |
| INVENTOR(S) | : Halme | |

It is certified that error appears in the above-identified patent and that said Letters Patent is hereby corrected as shown below:

In the Claims

Column 13,
Line 67, "in device external to the system" should read --in a device external to the system--.

Column 15,
Lines 8 and 16, cancel "compu";
Line 16, "search input" should read --a search input--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*